(12) United States Patent
Jiang et al.

(10) Patent No.: US 11,664,954 B2
(45) Date of Patent: *May 30, 2023

(54) METHOD AND DEVICE IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,050

(22) Filed: Jun. 28, 2022

(65) Prior Publication Data

US 2022/0329401 A1  Oct. 13, 2022

Related U.S. Application Data

(63) Continuation of application No. 16/869,607, filed on May 8, 2020, now Pat. No. 11,411,707, which is a
(Continued)

(51) Int. Cl.
*H04L 5/00* (2006.01)
*H04W 16/28* (2009.01)
(Continued)

(52) U.S. Cl.
CPC .......... *H04L 5/0094* (2013.01); *H04L 5/0051* (2013.01); *H04W 16/28* (2013.01); *H04W 24/10* (2013.01); *H04W 72/0446* (2013.01)

(58) Field of Classification Search
CPC ..... H04L 5/0094; H04L 5/0051; H04L 5/001; H04L 5/005; H04L 5/0053; H04L 5/0023;
(Continued)

(56) References Cited

U.S. PATENT DOCUMENTS

2014/0334402 A1* 11/2014 Chen ............... H04W 72/12 370/329
2017/0105112 A1   4/2017 Park et al.
(Continued)

FOREIGN PATENT DOCUMENTS

| CN | 104956611 A | 9/2015 |
| CN | 107005858 A | 8/2017 |

(Continued)

OTHER PUBLICATIONS

CN 1st Office Action received in application No. 201780094784.0 dated Apr. 1, 2022.
(Continued)

*Primary Examiner* — Thai Nguyen

(57) ABSTRACT

The disclosure provides a method and a device in a User Equipment (UE) and a base station for wireless communication. UE transmits first information, the first information being used for determining a first reference signal, then the UE receives second information in a first frequency subband in a first time window and detects third information in a second frequency subband in a second time window; the first time window is related to time-domain resources occupied by the first information; a first antenna port is used for transmitting the first reference signal, each antenna port used for transmitting the second information is spatially related to the first antenna port, and each antenna port used for transmitting the third information is spatially related to the first antenna port. The disclosure simplifies the processes of beam link failure judgement and beam management for a
(Continued)

UE, thereby improving the overall performance of the system.

24 Claims, 11 Drawing Sheets

Related U.S. Application Data continuation of application No. PCT/CN2017/110642, filed on Nov. 13, 2017.

(51) Int. Cl.
*H04W 24/10* (2009.01)
*H04W 72/0446* (2023.01)

(58) Field of Classification Search
CPC ... H04L 5/0092; H04L 5/0048; H04L 5/0078; H04W 16/28; H04W 24/10; H04W 72/0446; H04W 48/16; H04W 28/0231; H04B 7/06; H04B 7/0802
See application file for complete search history.

(56) References Cited

U.S. PATENT DOCUMENTS

| | | | |
|---|---|---|---|
| 2019/0058517 A1* | 2/2019 | Kang | H04B 7/0626 |
| 2019/0364556 A1* | 11/2019 | Davydov | H04B 7/0695 |

FOREIGN PATENT DOCUMENTS

| | | |
|---|---|---|
| CN | 107210801 A | 9/2017 |
| WO | 2014133650 A1 | 9/2014 |

OTHER PUBLICATIONS

CN 1st Search Report received in application No. 201780094784.0 dated Jun. 14, 2022.
3GPP tsg_ran\WG1_RL1 ZTE, ZTE Microelectronics R1-1701813 "On CSI-RSfor beam management" Feb. 7, 2017.
3GPP tsg_ran\WG1_RL1 Qualcomm Incorporated "R1-1718534 Radio linkmonitoringconsideration" Oct. 3, 2017.
3GPP tsg_ran\TSG_RAN NTT DOCOMO "Status RP-170376 Report of Study on NewAcces RadioTechnology" Feb. 28, 2017.
International Search Report received in application No. PCT/CN2017/110642, dated Apr. 23, 2018.

* cited by examiner

METHOD AND DEVICE IN UE AND BASE STATION FOR WIRELESS COMMUNICATION

CROSS REFERENCE TO RELATED APPLICATIONS

This application is a continuation of the U.S. patent application Ser. No. 16/869,607, filed on May 8,2020, which is a continuation of International Application No. PCT/CN2017/110642, filed on Nov. 13, 2017, the full disclosure of which is incorporated herein by reference.

BACKGROUND

Technical Field

The disclosure relates to transmission methods and devices in wireless communication systems, and in particular to a transmission method and device for radio signals supporting Bandwidth Part (BWP) dynamic switch.

Related Art

At present, technical discussions about 5G NR (New Radio Access Technology) are ongoing. Compared with Long-Term Evolution (LTE) and Long-Term Evolution Advanced (LTE-A), 5G systems introduce a concept of BWP, that is, when one cell has one Component Carrier (CC) with big bandwidth, a base station can divide the big CC into multiple BWPs so as to adapt to the User Equipment (UE) with small receiving bandwidth and transmitting bandwidth capabilities; when the UE with small bandwidth capability performs communication with a cell, the UE performs downlink reception or uplink transmission on one BWP only. Meanwhile, in order to improve the flexibility and timeliness of configuration of BWP, the RAN1 AH_Hoc conference in September in 2017 approved a scheme of dynamically switching BWP employing Downlink Control Information (DCI) containing scheduling.

At the same time, concepts of Beam Recover (BR) and Beam Link Failure (BLF) are being discussed in 5G systems; a UE detects multiple current serving beams to obtain dynamic scheduling; when channel qualities of the multiple serving beams detected by the UE are degraded, the UE transmits a beam recovery request to the base station to request new beam resources to monitor physical layer control signalings.

Therefore, when a UE performs dynamic switch between multiple BWPs, the above BLF detection and maintenance processes need to be reconsidered.

SUMMARY

In 5G systems, when one UE is served by multiple BWPs, one intuitive flow of BR is to perform detection on all serving beams in all the serving BWPs so as to ensure BLF will not occur and, if BLF is detected, to trigger a BR process on the multiple BWPs respectively. The above method has one following defect: when the UE is BWP limited, the UE cannot perform detection on multiple BWPs simultaneously, which hereby increases the time consumed by the BR process and has high demand on the power consumption and complexity of UE. At present, a concept of Quasi Co-location (QCL) is widely used in beamforming transmission. When two antenna ports are supposed to be Quasi Co-located (QCLed), radio signals transmitted by the two antenna ports are supposed to be same in average delay, Doppler shift or spatial RX parameters; thus, the two antenna ports are supposed to have same spatial properties. When one base station has multiple BWP resources, and some antenna ports located in different BWP resources still have QCL properties, the QCL properties may be applied to BLF determination and BR processes.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

transmitting first information, the first information being used for determining a first reference signal; and receiving second information in a first frequency subband in a first time window, and detecting third information in a second frequency subband in a second time window.

Herein, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one embodiment, the above method has the following benefits: when the antenna port used for transmitting the third information is QCLed with the first antenna port, a measurement result for the first reference signal in the first frequency subband is used for the antenna port transmitting the third information in the second frequency subband; that is, when antenna ports in two frequency subbands have a QCL relationship, spatial properties of one antenna port in one frequency subband may be applied to a QCLed antenna port in the other frequency subband.

In one embodiment, the above method has another following benefit: when an antenna port #A in the first frequency subband is QCLed with an antenna port #B in the second frequency subband, if a radio signal transmitted by the antenna port #A is supposed to be of beam failure, the UE assumes, without measurement, that a radio signal transmitted by the antenna port #B is of beam failure; if a radio signal transmitted by the antenna port #A is supposed to be able to meet reception requirements of a control signaling (considered as a candidate beam), the UE assumes, without measurement, that the antenna port #B meets reception requirements of a control signaling.

In one embodiment, the above method has the following benefits: the UE does not have to detect channel qualities in multiple frequency subbands, thereby reducing power consumption of the UE and simplifying the process of beam management.

According to one aspect of the disclosure, the above method includes:

receiving K1 candidate reference signals, the K1 being a positive integer greater than 1.

Herein, the first reference signal is one of the K1 candidate reference signals, and measurements for the K1 candidate reference signals are used for determining the first reference signal.

In one embodiment, the above method has the following benefits: the K1 candidate reference signals correspond to candidate beams detected by the UE, to ensure that a BR process is started timely when a problem occurs on a current serving beam.

In one embodiment, the above method has the following benefits: when the K1 candidate reference signals are all transmitted in the first frequency subband, and the K1 candidate reference signals are QCLed with reference signals in the second frequency subband, the UE can acquire a channel quality of the second frequency subband when detecting a channel of the first frequency subband, thereby reducing the complexity of implementation of the UE.

According to one aspect of the disclosure, the above method includes:

receiving K2 downlink signal(s), the K2 being a positive integer.

Herein, measurement(s) for the K2 downlink signal(s) is(are) used for triggering a transmitting of the first information.

In one embodiment, the above method has the following benefits: the K2 downlink signal(s) correspond(s) to K2 serving beams of the UE, that is, current downlink transmitting beams of the UE.

In one embodiment, the above method has the following benefits: when the K2 downlink signal(s) is(are) all transmitted in the first frequency subband, and the K2 downlink signal(s) is(are) QCLed with reference signal(s) in the second frequency subband, the UE can acquire a channel quality of the second frequency subband when detecting a channel of the first frequency subband, thereby reducing the complexity of implementation of the UE.

According to one aspect of the disclosure, the above method includes:

receiving fourth information; and detecting a first signaling and a second signaling in the first frequency subband and the second frequency subband respectively.

Herein, the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

In one embodiment, the above method has the following benefits: the UE receives services coming from a base station in both the first frequency subband the second frequency subband, before initiating a beam recovery process.

The disclosure provides a method in a base station for wireless communication, wherein the method includes:

receiving first information, the first information being used for determining a first reference signal; and transmitting second information in a first frequency subband in a first time window, and transmitting third information in a second frequency subband in a second time window.

Herein, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

According to one aspect of the disclosure, the above method includes:

transmitting K1 candidate reference signals, the K1 being a positive integer greater than 1.

Herein, the first reference signal is one of the K1 candidate reference signals, and measurements for the K1 candidate reference signals are used for determining the first reference signal.

According to one aspect of the disclosure, the above method includes:

transmitting K2 downlink signal(s), the K2 being a positive integer.

Herein, measurement(s) for the K2 downlink signal(s) is(are) used for triggering a transmitting of the first information.

According to one aspect of the disclosure, the above method includes:

transmitting fourth information; and transmitting a first signaling and a second signaling in the first frequency subband and the second frequency subband respectively.

Herein, the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

The disclosure provides a UE for wireless communication, wherein the UE includes:

a first transceiver, to transmit first information, the first information being used for determining a first reference signal; and a first receiver, to receive second information in a first frequency subband in a first time window, and to detect third information in a second frequency subband in a second time window.

Herein, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one embodiment, the above UE for wireless communication is characterized in that: the first transceiver further receives K1 candidate reference signals, the K1 being a positive integer greater than 1; the first reference signal is one of the K1 candidate reference signals, and measurements for the K1 candidate reference signals are used for determining the first reference signal.

In one embodiment, the above UE for wireless communication is characterized in that: the first transceiver further receives K2 downlink signal(s), the K2 being a positive integer; and measurement(s) for the K2 downlink signal(s) is(are) used for triggering a transmitting of the first information.

In one embodiment, the above UE for wireless communication is characterized in that: the first transceiver further receives fourth information, and the first transceiver further detects a first signaling and a second signaling in the first frequency subband and the second frequency subband respectively; the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

The disclosure provides a base station for wireless communication, wherein the base station includes:

a second transceiver, to receive first information, the first information being used for determining a first reference signal; and a first transmitter, to transmit second information in a first frequency subband in a first time window, and to transmit third information in a second frequency subband in a second time window.

Herein, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one embodiment, the above base station for wireless communication is characterized in that: the second transceiver further transmits K1 candidate reference signals, the K1 being a positive integer greater than 1; the first reference signal is one of the K1 candidate reference signals, and measurements for the K1 candidate reference signals are used for determining the first reference signal.

In one embodiment, the above base station for wireless communication is characterized in that: the second transceiver further transmits K2 downlink signal(s), the K2 being a positive integer; and measurement(s) for the K2 downlink signal(s) is(are) used for triggering a transmitting of the first information.

In one embodiment, the above base station for wireless communication is characterized in that: the second transceiver further transmits fourth information, and the second transceiver further transmits a first signaling and a second signaling in the first frequency subband and the second frequency subband respectively; the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

In one embodiment, compared with conventional schemes, the disclosure has the following benefits.

Through a QCL relationship between reference signals in multiple frequency subbands, when an antenna port #A in the first frequency subband is QCLed with an antenna port #B in the second frequency subband, the antenna port #A and the antenna port #B are considered by the UE to have same spatial properties; that is, if a radio signal transmitted by the antenna port #A is supposed to be of beam failure, the UE assumes, without measurement, that a radio signal transmitted by the antenna port #B is of beam failure; if a radio signal transmitted by the antenna port #A is supposed to be able to meet reception requirements of a control signaling (considered as a candidate beam), the UE assumes, without measurement, that the antenna port #B meets reception requirements of a control signaling.

The UE does not have to detect channel qualities in multiple frequency subbands, thereby reducing power consumption of the UE and simplifying the process of beam management.

When the UE is a frequency bandwidth limited UE, or multiple frequency subbands cross a large frequency bandwidth, the method provided in the disclosure enables the UE to acquire channel qualities of all frequency subbands without time-division measuring all frequency subbands, thereby reducing the time consumed to acquire all measurements, improving the efficiency of measurement and improving the efficiency of beam management process.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
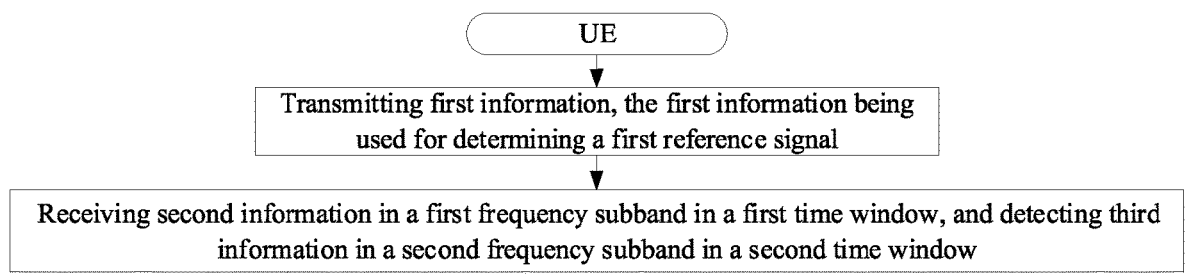
FIG. 1 is a flowchart of first information according to one embodiment of the disclosure.

Embodiment 1 illustrates an example of a flowchart of first information, as shown in FIG. 1.

In Embodiment 1, the UE in the disclosure first transmits first information, the first information being used for determining a first reference signal; then, the UE receives second information in a first frequency subband in a first time window and detects third information in a second frequency subband in a second time window; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the phrase that two antenna ports are spatially related refers that: the two antenna ports are QCLed.

In one subembodiment, the phrase that two antenna ports are spatially related refers that: the two antenna ports correspond to a same analog beamforming vector.

In one subembodiment, the phrase that two antenna ports are spatially related refers that: large-scale fading parameters corresponding to one of the two antenna ports can be used for deducing large-scale fading parameters corresponding to the other one of the two antenna ports.

In one subembodiment, the phrase that two antenna ports are spatially related refers that: a same receiving beamforming vector is employed to receive radio signals transmitted by the two antenna ports.

In one subembodiment, the phrase that two antenna ports are spatially related refers that: the two antenna ports correspond to an antenna port #1 and an antenna port #2 respectively, and a transmission delay obtained by the UE through a radio signal transmitted by the antenna port #1 is supposed to be the same as a transmission delay obtained by the UE through a radio signal transmitted by the antenna port #2.

In one subembodiment, the phrase that two antenna ports are spatially related refers that: the two antenna ports correspond to an antenna port #1 and an antenna port #2 respectively, and a Doppler frequency offset obtained by the UE through a radio signal transmitted by the antenna port #1 is supposed to be the same as a Doppler frequency offset obtained by the UE through a radio signal transmitted by the antenna port #2.

In one subembodiment, the phrase that two antenna ports are spatially related refers that: the two antenna ports correspond to an antenna port #1 and an antenna port #2 respectively, and a spatial receiving parameter obtained by the UE through a radio signal transmitted by the antenna port #1 is supposed to be the same as a spatial receiving parameter obtained by the UE through a radio signal transmitted by the antenna port #2.

In one affiliated embodiment of the above subembodiment, the spatial receiving parameter corresponds to a receiving beam.

In one affiliated embodiment of the above subembodiment, the spatial receiving parameter corresponds to a beamforming vector used by the UE for receiving.

In one subembodiment, the first reference signal is transmitted by the first antenna port only.

In one subembodiment, the first reference signal is transmitted by Q1 antenna ports, the first antenna port is any one of the Q1 antenna ports, and the Q1 is a positive integer greater than 1.

In one subembodiment, the first reference signal includes a synchronization signal.

In one subembodiment, the first reference signal includes a Synchronization Sequence Block (SSB).

In one subembodiment, the first reference signal includes a downlink reference signal.

In one subembodiment, the first reference signal includes a Channel State Information Reference Signal (CSI-RS).

In one subembodiment, the first reference signal includes a Demodulation Reference Signal (DMRS).

In one subembodiment, the first reference signal includes a first reference sub-signal and a second reference sub-signal; the first reference sub-signal and the second reference sub-signal are transmitted in the first frequency subband and the second frequency subband respectively.

In one subembodiment, the first reference signal is transmitted in the first frequency subband.

In one subembodiment, the first frequency subband and the second frequency subband are orthogonal in frequency domain.

In one subembodiment, the first frequency subband and the second frequency subband are one carrier respectively.

In one subembodiment, the first frequency subband and the second frequency subband are one BWP respectively.

In one subembodiment, the first frequency subband and the second frequency subband include a positive integer number of Physical Resource Blocks (PRBs) in frequency domain respectively.

In one subembodiment, the first frequency subband and the second frequency subband include a positive integer number of consecutive subcarriers respectively.

In one subembodiment, the first frequency subband corresponds to a first carrier, and the second frequency subband corresponds to a second carrier.

In one affiliated embodiment of the above subembodiment, the first carrier corresponds to one CC, and the second carrier corresponds to another CC.

In one affiliated embodiment of the above subembodiment, the first carrier corresponds to one Primary Cell (PCell), and the second carrier corresponds to one Secondary Cell (SCell).

In one subembodiment, the first time window and the second time window are orthogonal in time domain.

In one subembodiment, the first time window and the second time window are overlapping in time domain.

In one affiliated embodiment of the above subembodiment, time-domain resources occupied by the second information are orthogonal to the second time window in time domain.

In one subembodiment, the first time window occupies a positive integer number of consecutive slots in time domain.

In one subembodiment, the second time window occupies a positive integer number of consecutive slots in time domain.

In one subembodiment, the first information is a Beam Recovery Request (BRR); the second information is a response to the BRR, or the second information is a scheduling of a response to the BRR.

In one affiliated embodiment of the above subembodiment, the second information is a feedback for a BRR in the first frequency subband.

In one affiliated embodiment of the above subembodiment, the third information is used for the second frequency subband.

In one subembodiment, a physical layer channel corresponding to the first information is a Physical Random Access Channel (PRACH), or a physical layer channel corresponding to the first information is a Physical Uplink Control Channel (PUCCH).

In one subembodiment, a physical layer channel corresponding to the third information is a Physical Downlink Control Channel (PDCCH).

In one subembodiment, the third information is one piece of Downlink Control Information (DCI).

In one subembodiment, the first time window includes a positive integer number of slots, a first slot is one of the positive integer number of slots, the UE receives second information in a first time-frequency resource group in the first slot, and the first time-frequency resource group corresponds to the first reference signal.

In one affiliated embodiment of the above subembodiment, the first time-frequency resource group is one Control Resource Set (CORESET).

In one affiliated embodiment of the above subembodiment, the first time-frequency resource group occupies a positive integer number of Resource Elements (REs).

In one subembodiment, the phrase that the first time window is related to time-domain resources occupied by the first information refers that: the first information is transmitted in a first target slot, a start slot of the first time window is a second target slot, the first target slot and the second target slot have an interval of T1 slot(s), the T1 is a positive integer, and the first target slot is before the second target slot.

In one affiliated embodiment of the above subembodiment, the T1 is equal to one of 3, 7 or 15.

In one affiliated embodiment of the above subembodiment, the T1 is fixed.

In one subembodiment, the phrase that the second time window is related to time-domain resources occupied by the first information refers that: the first information is transmitted in a first target slot, a start slot of the second time window is a third target slot, the first target slot and the third target slot have an interval of T2 slot(s), the T2 is a positive integer, and the first target slot is before the third target slot.

In one affiliated embodiment of the above subembodiment, the T2 is equal to one of 3, 7 or 15.

In one affiliated embodiment of the above subembodiment, the T2 is fixed.

In one subembodiment, the phrase that the second time window is related to time-domain resources occupied by the second information refers that: the second information is transmitted in a fourth target slot, a start slot of the second time window is a third target slot, the fourth target slot and the third target slot have an interval of T3 slot(s), the T3 is a positive integer, and the fourth target slot is before the third target slot.

In one affiliated embodiment of the above subembodiment, the T3 is equal to one of 3, 7 or 15.

In one affiliated embodiment of the above subembodiment, the T3 is fixed.

Embodiment 2

Figure 2:
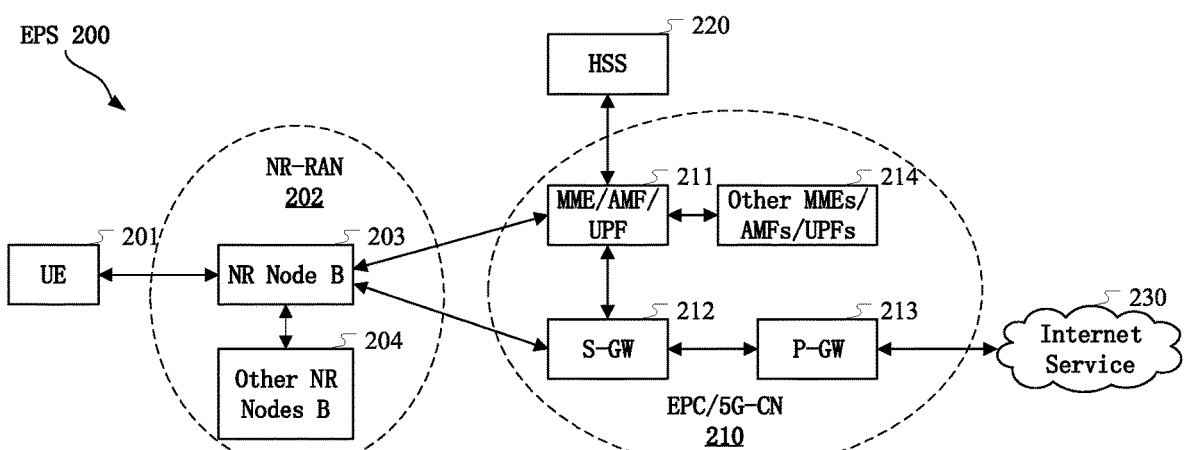
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the eNB 203 corresponds to the base station in the disclosure.

In one subembodiment, the UE 201 supports wireless communications with dynamic switch of BWP.

In one subembodiment, the gNB 203 supports wireless communications with dynamic switch of BWP.

In one subembodiment, the UE 201 supports wireless communications with carrier aggregation.

In one subembodiment, the gNB 203 supports wireless communications with carrier aggregation.

In one subembodiment, the UE 201 supports wireless communications in which transmitting antennas corresponding to reference signals in different frequency domain resources are QCLed.

In one subembodiment, the gNB 203 supports wireless communications in which transmitting antennas corresponding to reference signals in different frequency domain resources are QCLed.

Embodiment 3

Figure 3:
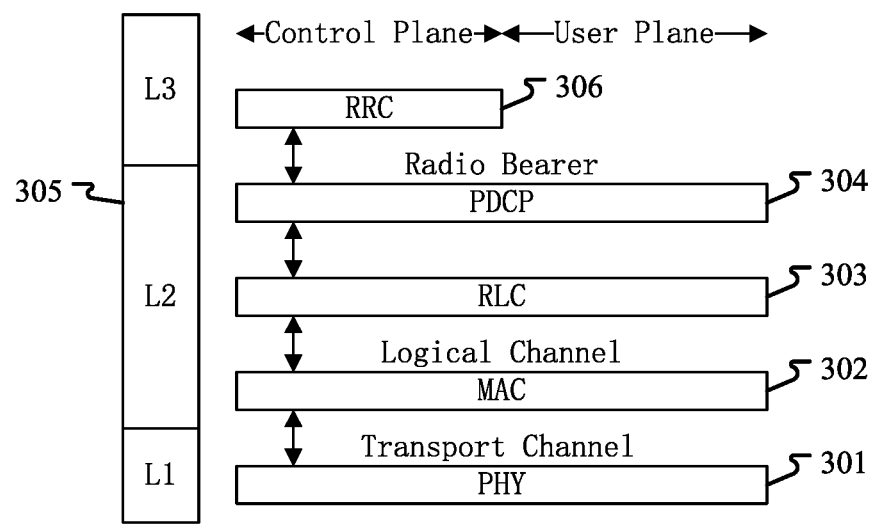
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first information in the disclosure is generated on the PHY 301.

In one subembodiment, the first information in the disclosure is generated on the MAC sublayer 302.

In one subembodiment, the second information in the disclosure is generated on the PHY 301.

In one subembodiment, the second information in the disclosure is generated on the MAC sublayer 302.

In one subembodiment, the third information in the disclosure is generated on the PHY 301.

In one subembodiment, the fourth information in the disclosure is generated on the RRC sublayer 306.

Embodiment 4

Figure 4:
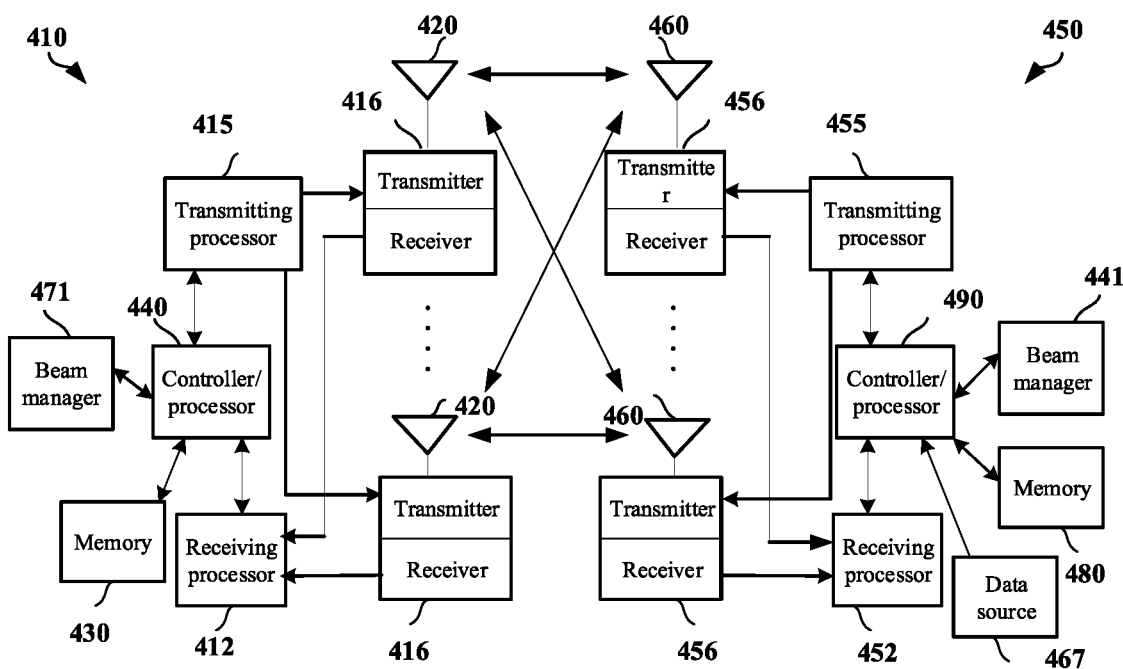
FIG. 4 is a diagram illustrating an eNB and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a beam manager 471, a transmitter/receiver 416 and an antenna 420.

The UE 450 includes a controller/processor 490, a memory 480, a data source 467, a transmitting processor 455, a receiving processor 452, a beam manager 441, a transmitter/receiver 456 and an antenna 460.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The beam manager 471 determines first information, and receives second information in a first frequency subband in a first time window and detects third information in a second frequency subband in a second time window, and transmits results to the controller/processor 440.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-toanalogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The beam manager 441 determines first information, and receives second information in a first frequency subband in a first time window and detects third information in a second frequency subband in a second time window, and transmits results to the controller/processor 490.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least transmits first information, the first information being used for determining a first reference signal, and receives second information in a first frequency subband in a first time window and detects third information in a second frequency subband in a second time window; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the UE 450 includes a memory that stores a computer readable instruction program. The computer readable instruction program generates an action when executed by at least one processor. The action includes: transmitting first information, the first information being used for determining a first reference signal, and receiving second information in a first frequency subband in a first time window and detecting third information in a second frequency subband in a second time window; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the gNB 410 includes at least one processor and at least one memory. The at least one memory includes computer program codes. The at least one memory and the computer program codes are configured to be used in collaboration with the at least one processor. The gNB 410 at least receives first information, the first information being used for determining a first reference signal, and transmits second information in a first frequency subband in a first time window and transmits third information in a second frequency subband in a second time window; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one embodiment, the gNB 410 includes a memory that stores a computer readable instruction program. The computer readable instruction program generates an action when executed by at least one processor. The action includes receiving first information, the first information being used for determining a first reference signal, and transmitting second information in a first frequency subband in a first time window and transmitting third information in a second frequency subband in a second time window; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the UE 450 corresponds to the UE in the disclosure.

In one subembodiment, the gNB 410 corresponds to the base station in the disclosure.

In one subembodiment, at least the former one of the beam manager 441 and the controller/processor 490 is used for determining first information.

In one subembodiment, at least the former one of the beam manager 441 and the controller/processor 490 is used for determining to transmit second information in a first frequency subband in a first time window and transmit third information in a second frequency subband in a second time window.

In one subembodiment, at least the former two of the transmitter 456, the transmitting processor 455 and the controller/processor 490 are used for transmitting first information.

In one subembodiment, at least the former two of the receiver 456, the receiving processor 452 and the controller/processor 490 are used for receiving second information in a first frequency subband in a first time window and detecting third information in a second frequency subband in a second time window.

In one subembodiment, at least the former two of the receiver 456, the receiving processor 452 and the controller/processor 490 are used for receiving K1 candidate reference signals, the K1 being a positive integer greater than 1.

In one subembodiment, at least the former two of the receiver 456, the receiving processor 452 and the controller/processor 490 are used for receiving K2 downlink signal(s), the K2 being a positive integer.

In one subembodiment, at least the former two of the receiver 456, the receiving processor 452 and the controller/processor 490 are used for receiving fourth information.

In one subembodiment, at least the former two of the receiver 456, the receiving processor 452 and the controller/processor 490 are used for detecting a first signaling and a second signaling in the first frequency subband and the second frequency subband respectively.

In one subembodiment, at least the former one of the beam manager 471 and the controller/processor 440 is used for determining first information.

In one subembodiment, at least the former one of the beam manager 471 and the controller/processor 440 is used for determining to transmit second information in a first frequency subband in a first time window and transmit third information in a second frequency subband in a second time window.

In one subembodiment, at least the former two of the receiver 416, the receiving processor 412 and the controller/processor 440 is used for receiving first information.

In one subembodiment, at least the former two of the transmitter 416, the transmitting processor 415 and the controller/processor 440 are used for transmitting second information in a first frequency subband in a first time window and transmitting third information in a second frequency subband in a second time window.

In one subembodiment, at least the former two of the transmitter 416, the transmitting processor 415 and the controller/processor 440 are used for transmitting K1 candidate reference signals, the K1 being a positive integer greater than 1.

In one subembodiment, at least the former two of the transmitter 416, the transmitting processor 415 and the controller/processor 440 are used for transmitting K2 downlink signal(s), the K2 being a positive integer.

In one subembodiment, at least the former two of the transmitter 416, the transmitting processor 415 and the controller/processor 440 are used for transmitting fourth information, and are used for transmitting a first signaling and a second signaling in the first frequency subband and the second frequency subband respectively.

In one subembodiment, at least the former two of the transmitter 416, the transmitting processor 415 and the controller/processor 440 are used for transmitting a first signaling and a second signaling in the first frequency subband and the second frequency subband respectively.

Embodiment 5

Figure 5:
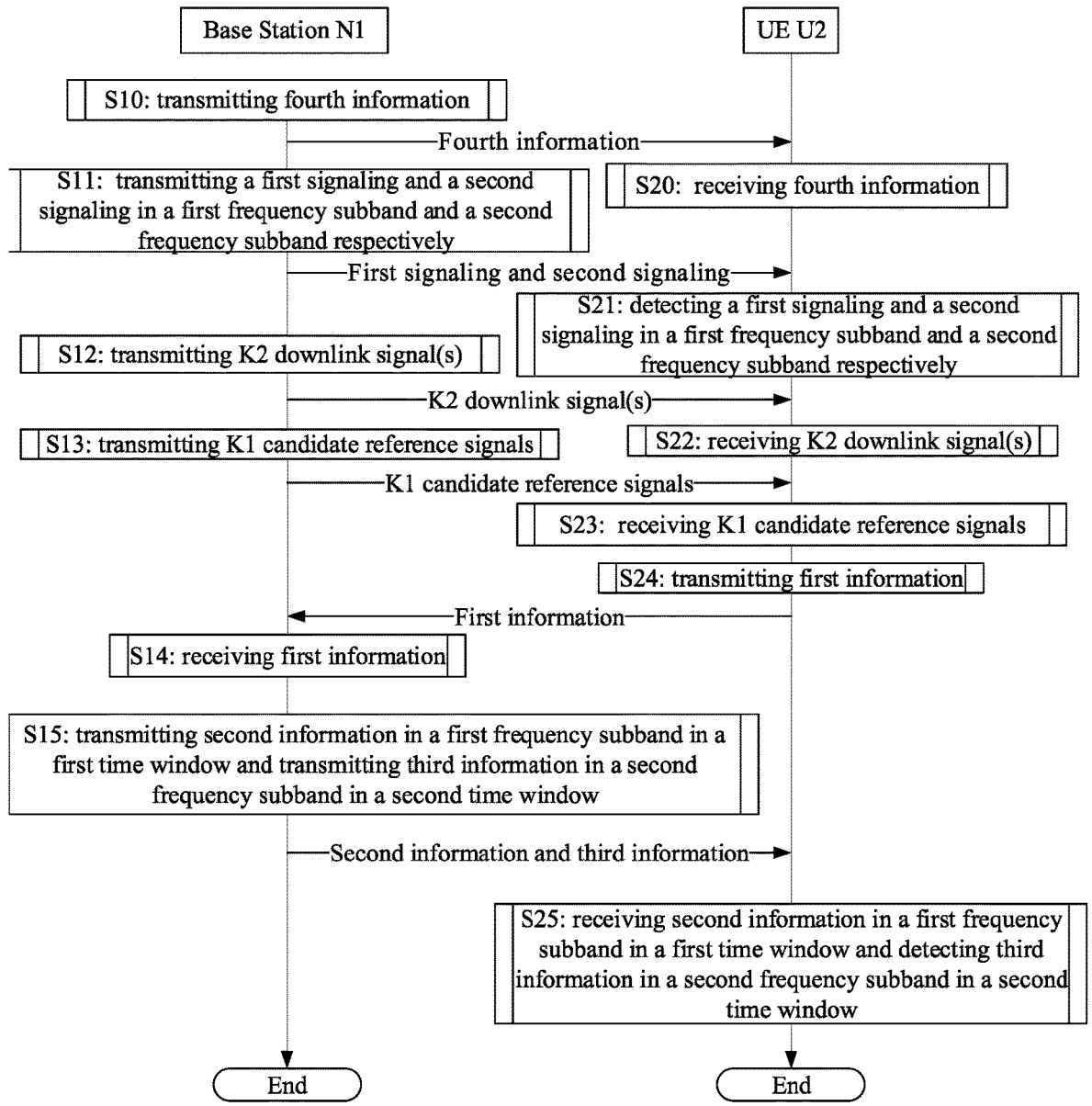
FIG. 5 is a flowchart of K1 candidate reference signals according to one embodiment of the disclosure.

Embodiment 5 illustrates an example of a flowchart of K1 candidate reference signals, as shown in FIG. 5. In FIG. 5, a base station N1 is a maintenance base station for a serving cell of a UE U2.

The base station N1 transmits fourth information in S10, transmits a first signaling and a second signaling in a first frequency subband and a second frequency subband respectively in S11, transmits K2 downlink signal(s) in S12, transmits K1 candidate reference signals in S13, receives first information in S14, and transmits second information in a first frequency subband in a first time window and transmits third information in a second frequency subband in a second time window in S15.

The UE U2 receives fourth information in S20, detects a first signaling and a second signaling in a first frequency subband and a second frequency subband respectively in S21, receives K2 downlink signal(s) in S22, receives K1 candidate reference signals in S23, transmits first information in S24, and receives second information in a first frequency subband in a first time window and detects third information in a second frequency subband in a second time window in S25.

In Embodiment 5, the first information is used for determining a first reference signal; the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port; the K1 is a positive integer greater than 1; the first reference signal is one of the K1 candidate reference signals, and measurements for the K1 candidate reference signals are used for determining the first reference signal; the K2 is a positive integer; measurement(s) for the K2 downlink signal(s) is(are) used for triggering a transmitting of the first information; the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

In one subembodiment, the UE U2 receives the K1 candidate reference signals using K1 receiving beamforming vectors respectively.

In one affiliated embodiment of the above subembodiment, any one of the K1 receiving beamforming vectors includes at least one of an analog beamforming vector or a digital beamforming vector.

In one subembodiment, the K1 candidate reference signals are transmitted by K1 candidate antenna port groups respectively.

In one affiliated embodiment of the above subembodiment, any one of the K1 candidate antenna port groups includes a positive integer number of antenna ports.

In one affiliated embodiment of the above subembodiment, the K1 candidate antenna port groups correspond to K1 candidate beams.

In one subembodiment, the K1 candidate reference signals are transmitted by K1 candidate antenna ports respectively.

In one affiliated embodiment of the above subembodiment, the K1 candidate antenna ports correspond to K1 candidate beams.

In one subembodiment, the first information is used for indicating the first reference signal from the K1 candidate reference signals.

In one subembodiment, the K1 candidate reference signals are all transmitted in the first frequency subband.

In one subembodiment, two of the K1 candidate reference signals are transmitted in the first frequency subband and the second frequency subband respectively.

In one subembodiment, each of the K1 candidate reference signals includes a first candidate reference sub-signal and a second candidate reference sub-signal; the first candidate reference sub-signal and the second candidate reference sub-signal are transmitted in the first frequency subband and the second frequency subband respectively.

In one affiliated embodiment of the above subembodiment, the first candidate reference sub-signal is a transmitted on a first candidate antenna port, the second candidate reference sub-signal is transmitted on a second candidate antenna port, the first candidate antenna port and the second candidate antenna port are spatially related.

In one subembodiment, the phrase that measurements for the K1 candidate reference signals are used for determining the first reference signal refers that: within a given time window, a first measurement result for the first reference signal is superior to a first threshold.

In one affiliated embodiment of the above subembodiment, the given time window includes a positive integer number of slots.

In one affiliated embodiment of the above subembodiment, the first measurement result is a Reference signal received power (RSRP).

In one affiliated embodiment of the above subembodiment, the first measurement result is a Reference signal received quality (RSRQ).

In one affiliated embodiment of the above subembodiment, the first measurement result is a Block Error Rate (BLER).

In one affiliated embodiment of the above subembodiment, the first measurement result and the first threshold are both in unit of dBm.

In one affiliated embodiment of the above subembodiment, the first measurement result and the first threshold are both in unit of dB.

In one affiliated embodiment of the above subembodiment, the first measurement result and the first threshold are both in unit of percentage.

In one affiliated embodiment of the above subembodiment, within the given time window, among the K1 measurement results for the K1 candidate reference signals, only the first measurement result is superior to the first threshold.

In one affiliated embodiment of the above subembodiment, within the given time window, among the K1 measurement results for the K1 candidate reference signals, the first measurement result is the top one in the K1 measurement results.

In one affiliated embodiment of the above subembodiment, the first threshold is fixed, or the first threshold is configured through a higher layer signaling.

In one subembodiment, the K1 candidate reference signals correspond to K1 identifiers respectively, the first reference signal corresponds to a first identifier, and the first information is used for determining the first identifier from the K1 identifiers.

In one subembodiment, any one of the K1 candidate reference signals includes at least one of an SSB, a CSI-RS or a DMRS.

In one subembodiment, the UE U2 receives the K2 downlink signal(s) employing K2 receiving beamforming vector(s) respectively.

In one subembodiment, the K2 downlink signal(s) is(are) transmitted by K2 target antenna port group(s) respectively.

In one affiliated embodiment of the above subembodiment, any one of the K2 target antenna port group(s) includes a positive integer number of antenna ports.

In one affiliated embodiment of the above subembodiment, K2 target antenna port group(s) correspond(s) to K2 serving beam(s).

In one affiliated embodiment of the above subembodiment, a first RE is an RE occupied by any one antenna port in any one of the K1 candidate antenna port group, a second RE is an RE occupied by any one antenna port in any one of the K2 target antenna port group(s), and channel information on the first RE cannot be used for deducing channel information on the second RE.

In one example of the above affiliated embodiment, the channel information includes small-scale channel information.

In one subembodiment, the K2 downlink signal(s) are transmitted by K2 target antenna port(s) respectively.

In one affiliated embodiment of the above subembodiment, the K2 target antenna port(s) correspond(s) to K2 serving beam(s).

In one affiliated embodiment of the above subembodiment, a third RE is an RE occupied by any one of the K1 candidate antenna ports, a fourth RE is an RE occupied by any one of the K2 target antenna port(s), and channel information on the third RE cannot be used for deducing channel information on fourth second RE.

In one example of the above affiliated embodiment, the channel information includes small-scale channel information.

In one subembodiment, the phrase that measurement(s) for the K2 downlink signal(s) is(are) used for triggering a transmitting of the first information refers: within a target time window, K2 detection result(s) for the K2 downlink signal(s) is(are) inferior to K2 target threshold(s) respectively, then the transmitting of the first information is triggered.

In one affiliated embodiment of the above subembodiment, the phrase that, within a target time window, K2 detection result(s) for the K2 downlink signal(s) is(are) inferior to K2 target threshold(s) respectively refers that: in M slots within the target time window, the K2 detection result(s) is(are) inferior to the K2 target threshold(s) respectively.

In one example of the above affiliated embodiment, the K2 detection result(s) is(are all) RSRP(s).

In one example of the above affiliated embodiment, the K2 detection result(s) is(are all) RSRQ(s).

In one example of the above affiliated embodiment, the K2 detection result(s) is(are all) BLER(s).

In one example of the above affiliated embodiment, both the K2 detection result(s) and the K2 target threshold(s) are in unit of dBm.

In one example of the above affiliated embodiment, both the K2 detection result(s) and the K2 target threshold(s) are in unit of dB.

In one affiliated embodiment of the above subembodiment, both the K2 detection result(s) and the K2 target threshold(s) are in unit of percentage.

In one affiliated embodiment of the above subembodiment, the K2 target threshold(s) is(are all) fixed, or the K2 target threshold(s) is(are all) configured through a higher layer signaling.

In one subembodiment, any one of the K2 downlink signal(s) includes at least one of a CSI-RS, an SSB or a DM-RS.

In one subembodiment, any one of the K2 downlink signal(s) includes a Physical Downlink Control Channel (PDCCH).

In one subembodiment, the K2 downlink signal(s) is(are all) transmitted in the first frequency subband.

In one subembodiment, two of the K2 downlink signals are transmitted in the first frequency subband and the second frequency subband respectively.

In one subembodiment, each of the K2 downlink signal(s) includes a first downlink sub-signal and a second downlink sub-signal; the first downlink sub-signal and the second downlink sub-signal are transmitted in the first frequency subband and the second frequency subband respectively.

In one subembodiment, the first frequency subband set form one carrier, and the multiple frequency subbands are multiple BWPs in the carrier.

In one subembodiment, the first signaling is one DCI.

In one subembodiment, the second signaling is one DCI.

In one subembodiment, the UE U2 detects the first signaling and the second signaling in a third time window, and the third time window is located before the first time window and the second time window.

In one affiliated embodiment of the above subembodiment, the third time window occupies a positive integer number of slots in time domain.

Embodiment 6

Figure 6:
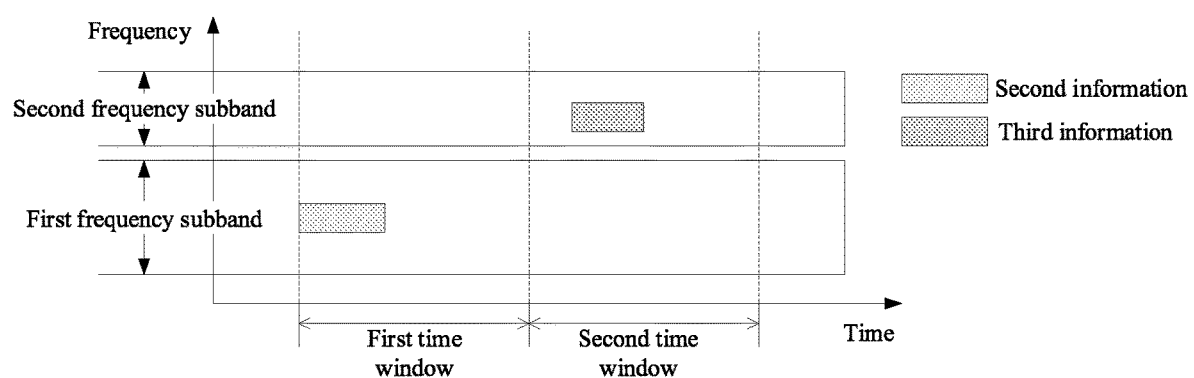
FIG. 6 is a diagram illustrating a first time window and a second time window according to one embodiment of the disclosure.

Embodiment 6 illustrates an example of a diagram of a first time window and a second time window, as shown in FIG. 6. In FIG. 6, the first time window and the second time window are orthogonal in time domain; the first time window is located before the second time window in time domain; the UE receives second information in the first time window and detects third information in the second time window.

In one subembodiment, the second information is transmitted on a Downlink Shared Channel (DL-SCH).

In one subembodiment, the second information is used by the base station to acknowledge correct reception of the first information to the UE.

In one subembodiment, the second information is transmitted multiple times by the base station in the first time window.

In one subembodiment, the third information is transmitted on a DL-SCH.

In one subembodiment, the third information is transmitted on a PDCCH.

Embodiment 7

Figure 7:
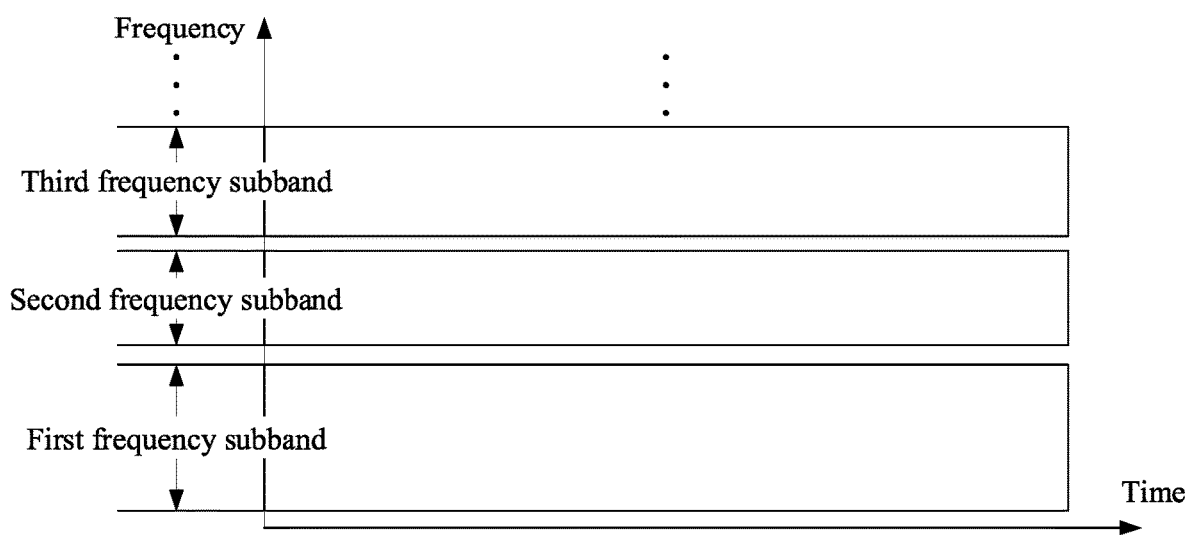
FIG. 7 is a diagram illustrating a first frequency subband and a second frequency subband according to one embodiment of the disclosure.

Embodiment 7 illustrates an example of a diagram of a first frequency subband resource and a second frequency subband resource, as shown in FIG. 7. In FIG. 7, the first frequency subband and the second frequency subband both belong to a first frequency subband set; in addition of the first frequency subband and the second frequency subband, the first frequency subband set further includes a third frequency subband; the first frequency subband, the second frequency subband and the third frequency subband are all consecutive in frequency domain.

In one subembodiment, the first frequency subband set includes N frequency subbands, and the N frequency subbands include the first frequency subband, the second frequency subband and the third frequency subband.

In one affiliated embodiment of the above subembodiment, the N is equal to 4, 5, 8, 16 or 32.

In one affiliated embodiment of the above subembodiment, the fourth information in the disclosure is used for determining the first frequency subband set, and the fourth information is a higher layer signaling.

In one example of the above affiliated embodiment, the higher layer signaling is cell specific.

In one subembodiment, the first frequency subband and the second frequency subband correspond to different subcarrier spacings respectively.

In one subembodiment, a frequency bandwidth occupied by the first frequency subband is different from that occupied by the second frequency subband.

In one subembodiment, the first frequency subband set belongs to a given carrier, and the given carrier corresponds to one serving cell.

In one subembodiment, any two frequency subbands in the first frequency subband set that are adjacent in frequency domain have a protection interval in frequency domain.

Embodiment 8

Figure 8:
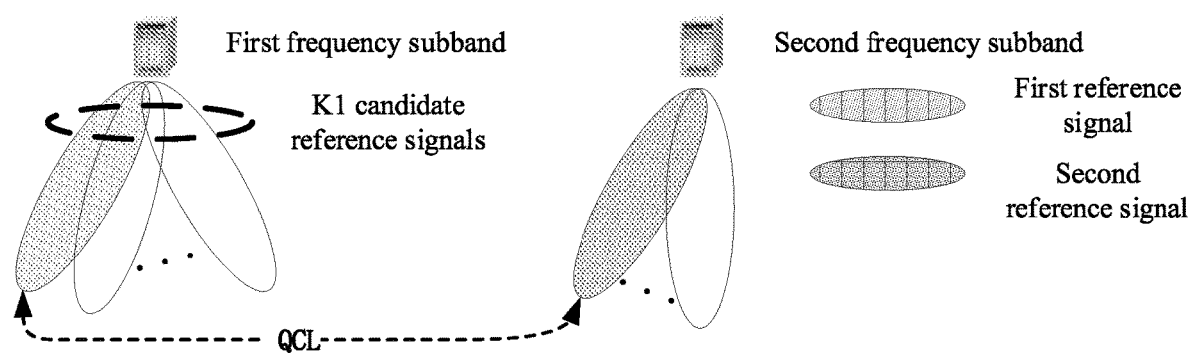
FIG. 8 is a diagram illustrating a first reference signal according to one embodiment of the disclosure.

Embodiment 8 illustrates an example of a diagram of a first reference signal, as shown in FIG. 8. In FIG. 8, the K1 candidate reference signals in the disclosure correspond to K1 candidate reference signal configurations, the first reference signal corresponds to a first reference signal configuration in the K1 candidate reference signal configurations; the K1 candidate reference signals are all transmitted in the first frequency subband, the second frequency subband in the disclosure has a second reference signal, and the second reference signal corresponds to a second reference signal configuration; an antenna port transmitting the second reference signal is QCLed with an antenna port transmitting the first reference signal.

In one subembodiment, the K1 reference signal configurations correspond to K1 candidate beams.

In one subembodiment, besides the second reference signal, the second frequency subband further transmits other reference signals.

In one affiliated embodiment of the above subembodiment, the other reference signals include a third reference signal.

In one subembodiment, the UE in the disclosure receives K1 candidate reference signals employing K1 receiving beamforming vectors respectively.

In one affiliated embodiment of the above subembodiment, any one of the K1 receiving beamforming vectors includes at least one of analog beamforming vector or a digital beamforming vector.

In one subembodiment, the K1 candidate reference signals form K1 analog beams for the UE respectively.

In one subembodiment, the K1 candidate reference signal configurations correspond to K1 transmitting antenna ports.

In one subembodiment, the K1 candidate reference signal configurations correspond to K1 transmitting antenna port groups.

Embodiment 9

Figure 9:
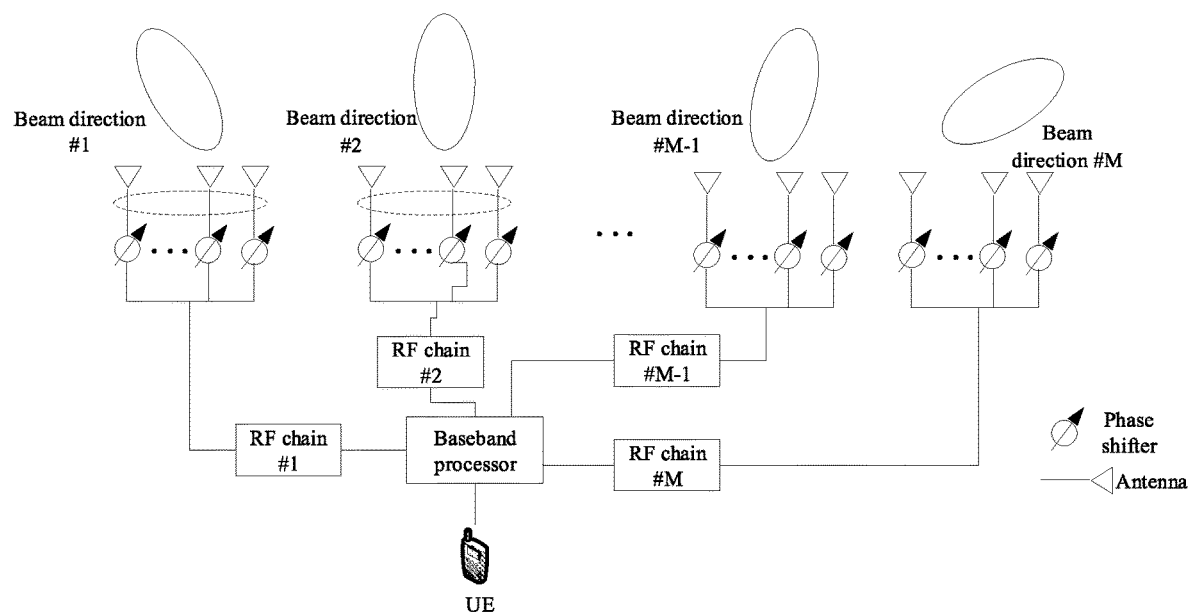
FIG. 9 is a diagram illustrating an antenna structure equipped on a UE according to one embodiment of the disclosure.

Embodiment 9 illustrates an example of a diagram of an antenna structure equipped on a UE, as shown in FIG. 9. In FIG. 9, the UE is equipped with M Radio Frequency (RF) chains, which are an RF chain #1, an RF chain #2, ..., an RF chain #M respectively. The M RF chains are connected to one baseband processor.

In one subembodiment, any one of the M RF chains supports a bandwidth not larger than a bandwidth of a frequency subband configured for the UE.

In one subembodiment, M1 RF chains among the M RF chains generate one antenna port through antenna virtualization superposition, the M1 RF chains are connected to M1 antenna groups respectively, and each of the M1 antenna groups includes a positive integer number of antennas. One antenna group is connected to a baseband processor through one RF chain, and different antenna groups correspond to different RF chains. Mapping coefficients from antennas included in any one of the M1 antenna groups to the antenna port constitute an analog beamforming vector of the antenna group. Analog beamforming vectors corresponding to the M1 antenna groups are diagonally arranged to form an analog beamforming matrix of the antenna port. Mapping coefficients from the M1 antenna groups to the antenna port constitute a digital beamforming vector corresponding to the antenna port.

In one subembodiment, the M1 RF chains belong to one same panel.

In one subembodiment, the M1 RF chains are QCLed.

In one subembodiment, M2 RF chains among the M RF chains generate one receiving beam through antenna virtualization superposition, the M2 RF chains are connected to M2 antenna groups respectively, and each of the M2 antenna groups includes a positive integer number of antennas. One antenna group is connected to a baseband processor through one RF chain, and different antenna groups correspond to different RF chains. Mapping coefficients from antennas included in any one of the M2 antenna groups to the receiving beam constitute an analog beamforming vector of the receiving beam. Analog beamforming vectors corresponding to the M2 antenna groups are diagonally arranged to form an analog beamforming matrix of the receiving beam. Mapping coefficients from the M2 antenna groups to the receiving beam constitute a digital beamforming vector corresponding to the receiving beam.

In one subembodiment, the M2 RF chains belong to one same panel.

In one subembodiment, the M2 RF chains are QCLed.

In one subembodiment, the directions of analog beams formed by the M RF chains are a beam direction #1, a beam direction #2, a beam direction #M−1 and a beam direction #M as shown in FIG. 9 respectively.

In one subembodiment, any one of the M1 RF chains can receive a corresponding radio signal in one of the L1 frequency subbands only.

In one subembodiment, any one of the M1 RF chains can transmit a corresponding radio signal in one of the L1 frequency subbands only.

In one subembodiment, all the M RF chains can receive radio signals in the first frequency subband and the second frequency subband.

In one subembodiment, an RF chain #1, an RF chain #2, ..., an RF chain #M/2 among the M RF chains receive radio signals in the first frequency subband; an RF chain #M/2+1, an RF chain #M/2+2, ..., an RF chain #M among the M RF chains receive radio signals in the second frequency subband.

In one subembodiment, all the M RF chains can receive the K1 candidate reference signals in the disclosure.

In one subembodiment, all the M RF chains can receive the K2 downlink signal(s) in the disclosure.

In one subembodiment, the UE in Embodiment 9 is the UE U6 illustrated in Embodiment 7; if the L2 is 1 in Embodiment 7, the multiantenna relevant capability under the target transmission configuration indicates that a maximum number of antenna ports (of the UE U6) used for transmitting each of the L1 radio signals can be M; if the L2 is 2 in Embodiment 7, the multiantenna relevant capability under the target transmission configuration indicates that a maximum number of antenna ports (of the UE U6) used for transmitting each of the L1 radio signals can be M/2 only.

In one subembodiment, a total number of layers configured in each of parallel frequency subbands for the UE is less than or equal to the M.

In one subembodiment, a total number of antenna ports configured in each of parallel frequency subbands for the UE is less than or equal to the M.

In one subembodiment, for each of the parallel frequency subbands, a mapping relationship between a layer and an antenna port is related to both the number of layers and the number of antenna ports.

In one subembodiment, for each of the parallel frequency subbands, a mapping relationship between a layer and an antenna port is default (that is, no explicit configuration is needed).

In one subembodiment, a layer and an antenna port are in one-to-one correspondence.

In one subembodiment, one layer is mapped to multiple antenna ports.

In one subembodiment, the M is an even number, an RF chain #1, an RF chain #2, ..., an RF chain #M/2 among the M RF chains are connected to a first panel, and an RF chain #M/2+1, an RF chain #M/2+2, ..., an RF chain #M among the M RF chains are connected to a second panel.

In one subembodiment, the first panel and the second panel employ different crystal oscillators respectively.

Embodiment 10

Figure 10:
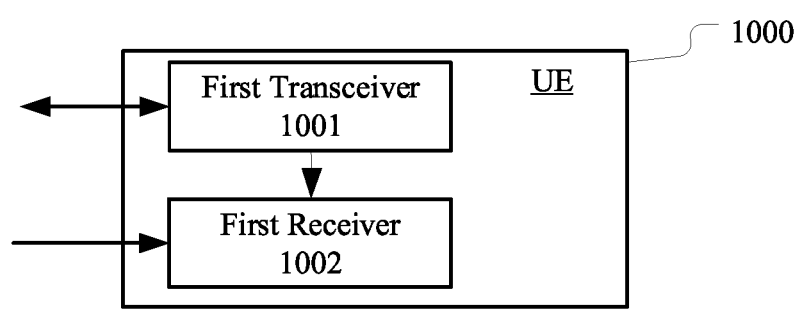
FIG. 10 is a structure block diagram illustrating a processing device in a UE according to one embodiment of the disclosure.

Embodiment 10 illustrates a structure block diagram of a processing device in a UE, as shown in FIG. 10. In FIG. 10, the processing device 1000 in the UE mainly includes a first transceiver 1001 and a first receiver 1002.

The first transceiver 1001 transmits first information, the first information being used for determining a first reference signal.

The first receiver 1002 receives second information in a first frequency subband in a first time window, and detects third information in a second frequency subband in a second time window.

In Embodiment 10, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the first transceiver 1001 further receives K1 candidate reference signals, the K1 being a positive integer greater than 1; the first reference signal is one of the K1 candidate reference signals, and measurements for the K1 candidate reference signals are used for determining the first reference signal.

In one subembodiment, the first transceiver 1001 further receives K2 downlink signal(s), the K2 being a positive integer; and measurement(s) for the K2 downlink signal(s) is(are) used for triggering a transmitting of the first information.

In one subembodiment, the first transceiver 1001 further receives fourth information, and the first transceiver 1001 further detects a first signaling and a second signaling in the first frequency subband and the second frequency subband respectively; the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

In one subembodiment, the first transceiver 1001 includes at least the former four of the receiver/transmitter 456, the receiving processor 452, the transmitting processor 455, the beam manager 441 or the controller/processor 490 illustrated in Embodiment 4.

In one subembodiment, the first receiver 1002 includes at least the former two of the receiver 456, the receiving processor 452, the beam manager 441 or the controller/processor 490 illustrated in Embodiment 4.

Embodiment 11

Figure 11:
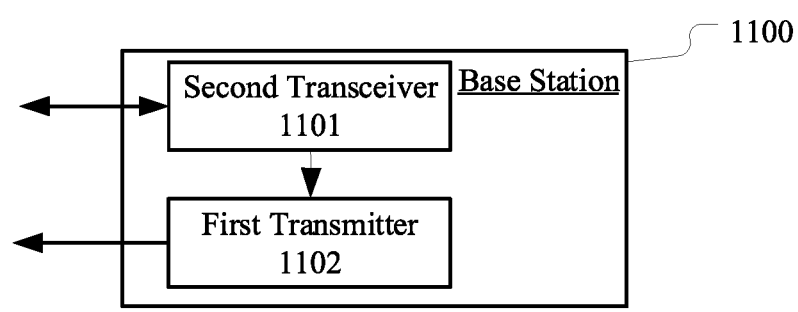
FIG. 11 is a structure block diagram illustrating a processing device in a base station according to one embodiment of the disclosure.

Embodiment 11 illustrates an example of a structure block diagram of a processing device in a base station, as shown in FIG. 11. In FIG. 11, the processing device in the base station mainly includes a second transceiver 1101 and a first transmitter 1102.

The second transceiver 1101 receives first information, the first information being used for determining a first reference signal.

The first transmitter 1102 transmits second information in a first frequency subband in a first time window, and transmits third information in a second frequency subband in a second time window.

In Embodiment 11, the first time window is related to time-domain resources occupied by the first information; the second time window is related to time-domain resources occupied by the first information, or, the second time window is related to time-domain resources occupied by the second information; a first antenna port is used for transmitting the first reference signal, each antenna port used for transmitting the second information is spatially related to the first antenna port, and each antenna port used for transmitting the third information is spatially related to the first antenna port.

In one subembodiment, the second transceiver 1101 further transmits K1 candidate reference signals, the K1 being a positive integer greater than 1; the first reference signal is one of the K1 candidate reference signals, and measurements for the K1 candidate reference signals are used for determining the first reference signal.

In one subembodiment, the second transceiver 1101 further transmits K2 downlink signal(s), the K2 being a positive integer; and measurement(s) for the K2 downlink signal(s) is(are) used for triggering a transmitting of the first information.

In one subembodiment, the second transceiver 1101 further transmits fourth information, and the second transceiver 1101 further transmits a first signaling and a second signaling in the first frequency subband and the second frequency subband respectively; the fourth information is used for determining a first frequency subband set, the first frequency subband set includes multiple frequency subbands, both the first frequency subband and the second frequency subband belong to the first frequency subband set, an antenna port used for transmitting the first signaling is at least spatially related to a transmitting antenna port of one downlink signal included in the K2 downlink signal(s), and an antenna port used for transmitting the second signaling is at least spatially related to a transmitting antenna port of one downlink signal included in the K2 downlink signal(s).

In one subembodiment, the second transceiver 1101 includes at least the former four of the receiver/transmitter 416, the receiving processor 412, the transmitting processor 415, the beam manager 471 or the controller/processor 440 illustrated in Embodiment 4.

In one subembodiment, the first transmitter 1102 includes at least the former two of the transmitter 416, the transmitting processor 415, the beam manager 471 or the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station, gNB (NR node B), Transmitter Receiver Point (TRP) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:

transmitting first information, the first information being used for determining a first reference signal; and receiving second information in a first frequency subband in a first time window, and detecting third information in a second frequency subband in a second time window; wherein:

the first time window is related to time-domain resources occupied by the first information;

the second time window is related to time-domain resources occupied by the first information, or, the second time window is related to time-domain resources occupied by the second information; wherein:

a first antenna port is used for transmitting the first reference signal;

each antenna port used for transmitting the second information is spatially related to the first antenna port; and
each antenna port used for transmitting the third information is spatially related to the first antenna port; the first frequency subband corresponds to a first carrier, and the second frequency subband corresponds to a second carrier.

2. A method in a base station for wireless communication, comprising:
receiving first information, the first information being used for determining a first reference signal; and
transmitting second information in a first frequency subband in a first time window, and transmitting third information in a second frequency subband in a second time window; wherein:
the first time window is related to time-domain resources occupied by the first information;
the second time window is related to time-domain resources occupied by the first information, or, the second time window is related to time-domain resources occupied by the second information; wherein:
a first antenna port is used for transmitting the first reference signal;
each antenna port used for transmitting the second information is spatially related to the first antenna port; and
each antenna port used for transmitting the third information is spatially related to the first antenna port; the first frequency subband corresponds to a first carrier, and the second frequency subband corresponds to a second carrier.

3. The method according to claim 2, further comprising:
transmitting K1 candidate reference signals prior to receiving the first information, the K1 being a positive integer greater than 1; wherein:
the first reference signal is one of the K1 candidate reference signals;
measurements for the K1 candidate reference signals are used for determining the first reference signal; and
the first information is used to indicate the first reference signal.

4. The method according to claim 2, comprising:
transmitting K2 downlink signal(s), the K2 being a positive integer;
wherein measurement(s) for the K2 downlink signal(s) is(are) used for triggering a transmitting of the first information.

5. The method according to claim 4, further comprising:
transmitting fourth information; and
transmitting a first signaling and a second signaling in the first frequency subband and the second frequency subband respectively;
wherein the fourth information is used for determining a first frequency subband set;
the first frequency subband set includes multiple frequency subbands;
both the first frequency subband and the second frequency subband belong to the first frequency subband set;
an antenna port transmitting the first signaling is spatially related to at least one of a plurality of transmitting antenna ports that transmits one of the K2 downlink signal(s); and
an antenna port transmitting the second signaling is spatially related to at least one of the transmitting antenna ports that transmits one of the K2 downlink signal(s).

6. The method according to claim 2, wherein each antenna port transmitting the second information is Quasi Co-located to the first antenna port, and each antenna port transmitting the third information is Quasi Co-located to the first antenna port.

7. A UE for wireless communication, comprising:
a first transceiver, to transmit first information, the first information being used for determining a first reference signal; and
a first receiver, to receive second information in a first frequency subband in a first time window, and to detect third information in a second frequency subband in a second time window;
wherein the first time window is related to time-domain resources occupied by the first information; the second time window is related to time-domain resources occupied by the first information, or, the second time window is related to time-domain resources occupied by the second information; wherein:
a first antenna port is used for transmitting the first reference signal;
each antenna port used for transmitting the second information is spatially related to the first antenna port; and
each antenna port used for transmitting the third information is spatially related to the first antenna port; the first frequency subband corresponds to a first carrier, and the second frequency subband corresponds to a second carrier.

8. The UE according to claim 7, wherein the first transceiver receives K1 candidate reference signals prior to the first transceiver transmitting the first information, the K1 being a positive integer greater than 1;
the first reference signal is one of the K1 candidate reference signals;
measurements for the K1 candidate reference signals are used for determining the first reference signal; and
the first information is used to indicate the first reference signal.

9. The UE according to claim 7, wherein the first transceiver receives K2 downlink signal(s), the K2 being a positive integer; and measurement(s) for the K2 downlink signal(s) is(are) used for triggering a transmitting of the first information.

10. The UE according to claim 9, wherein the first transceiver receives fourth information, and detects a first signaling and a second signaling in the first frequency subband and the second frequency subband respectively; wherein:
the fourth information is used for determining a first frequency subband set;
the first frequency subband set includes multiple frequency subbands;
both the first frequency subband and the second frequency subband belong to the first frequency subband set;
an antenna port transmitting the first signaling is spatially related to the at least one of a plurality of transmitting antenna ports that transmits one of the K2 downlink signal(s); and
an antenna port transmitting the second signaling is spatially related to at least one of the transmitting antenna ports that transmits one of the K2 downlink signal(s).

11. The UE according to claim 7, wherein each antenna port transmitting the second information is Quasi Co-located to the first antenna port, and each antenna port transmitting the third information is Quasi Co-located to the first antenna port.

12. The UE according to claim 7, wherein the second information and the first reference signal are Quasi Co-located, the third information and the first reference signal are Quasi Co-located.

13. The UE according to claim 7, wherein a physical layer channel corresponding to the first information is a Physical Random Access Channel.

14. The UE according to claim 7, wherein the first reference signal includes at least one of a Synchronization Sequence Block or a Channel State Information Reference Signal.

15. The UE according to claim 7, wherein the first information is a Beam Recovery Request (BRR); the second information is a response to the BRR, or the second information is a scheduling of a response to the BRR.

16. The UE according to claim 7, wherein a physical layer channel corresponding to the third information is a Physical Downlink Control Channel.

17. The UE according to claim 7, wherein the first information is transmitted in a first target slot, a start slot of the first time window is a second target slot, the first target slot and the second target slot have an interval of T1 slot(s), the T1 is a positive integer, and the first target slot is before the second target slot; the T1 is equal to one of 3, 7 or 15; or the T1 is fixed.

18. The UE according to claim 7, wherein the first information is transmitted in a first target slot, a start slot of the second time window is a third target slot, the first target slot and the third target slot have an interval of T2 slot(s), the T2 is a positive integer, and the first target slot is before the third target slot; the T2 is equal to one of 3, 7 or 15; or the T2 is fixed.

19. The UE according to claim 7, wherein the second information is transmitted in a fourth target slot, a start slot of the second time window is a third target slot, the fourth target slot and the third target slot have an interval of T3 slot(s), the T3 is a positive integer, and the fourth target slot is before the third target slot; the T3 is equal to one of 3, 7 or 15; or the T3 is fixed.

20. The UE according to claim 8, wherein the phrase that measurements for the K1 candidate reference signals are used for determining the first reference signal refers that: within a given time window, a first measurement result for the first reference signal is superior to a first threshold; the first measurement result is a Reference signal received power (RSRP); or the first measurement result is a Reference signal received quality (RSRQ); or the first measurement result is a Block Error Rate (BLER).

21. The UE according to claim 8, wherein the K1 candidate reference signals correspond to K1 identifiers respectively, the first reference signal corresponds to a first identifier, and the first information is used for determining the first identifier from the K1 identifiers.

22. The UE according to claim 8, wherein any one of the K1 candidate reference signals includes at least one of an SSB, a CSI-RS or a DMRS.

23. The UE according to claim 9, wherein the phrase that measurement(s) for the K2 downlink signal(s) is(are) used for triggering a transmitting of the first information refers: within a target time window, K2 detection result(s) for the K2 downlink signal(s) is(are) inferior to K2 target threshold(s) respectively, then the transmitting of the first information is triggered; the K2 detection result(s) is(are all) RSRP(s); or the K2 detection result(s) is(are all) RSRQ(s); or the K2 detection result(s) is(are all) BLER(s).

24. The UE according to claim 10, the fourth information in the disclosure is used for determining the first frequency subband set, and the fourth information is a higher layer signaling.

* * * * *